US009723699B1

(12) United States Patent
Von Novak, III et al.

(10) Patent No.: US 9,723,699 B1
(45) Date of Patent: Aug. 1, 2017

(54) METHODS AND APPARATUS FOR WIRELESSLY POWERED LIGHTING

(71) Applicant: QUALCOMM Incorporated, San Diego, CA (US)

(72) Inventors: William Henry Von Novak, III, San Diego, CA (US); Kelsey Lynn Burrell, Santee, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/197,515

(22) Filed: Jun. 29, 2016

(51) Int. Cl.
| H01P 7/00 | (2006.01) |
| H05B 37/02 | (2006.01) |
| H02J 50/12 | (2016.01) |
| H05B 33/08 | (2006.01) |

(52) U.S. Cl.
CPC .......... *H05B 37/0272* (2013.01); *H02J 50/12* (2016.02); *H05B 33/0806* (2013.01); *H05B 33/0845* (2013.01)

(58) Field of Classification Search
CPC . H02J 50/12; H05B 33/0806; H05B 33/0845; H05B 37/0272
See application file for complete search history.

(56) References Cited

U.S. PATENT DOCUMENTS

| 5,034,658 | A | * | 7/1991 | Hierig | .................... | A47G 33/08 |
| | | | | | | 315/149 |
| 5,118,196 | A | * | 6/1992 | Ault | ...................... | A47G 33/06 |
| | | | | | | 315/248 |
| 8,659,237 | B2 | | 2/2014 | Archenhold | | |
| 8,841,845 | B2 | * | 9/2014 | Montemayor | .......... | H01F 27/30 |
| | | | | | | 315/256 |
| 8,901,857 | B2 | * | 12/2014 | Lanchava | .............. | F21V 21/096 |
| | | | | | | 315/312 |
| 9,192,031 | B2 | | 11/2015 | Deyaf | | |
| 2013/0057364 | A1 | * | 3/2013 | Kesler | ..................... | B60L 11/182 |
| | | | | | | 333/219.2 |
| 2013/0057464 | A1 | | 3/2013 | Hsiao et al. | | |
| 2015/0257242 | A1 | * | 9/2015 | Deyaf | ................. | H05B 37/0272 |
| | | | | | | 315/77 |
| 2015/0333533 | A1 | * | 11/2015 | Higgins | ................... | H02J 5/005 |
| | | | | | | 315/70 |
| 2016/0006289 | A1 | | 1/2016 | Sever et al. | | |

* cited by examiner

*Primary Examiner* — Alexander H Taningco
*Assistant Examiner* — Kurtis R Bahr
(74) *Attorney, Agent, or Firm* — Knobbe, Martens, Olson & Bear, LLP

(57) ABSTRACT

Aspects comprise apparatus and methods for wirelessly powered lighting products. One aspect comprises an apparatus that generates light from a wirelessly coupled power source. The apparatus comprises a first conductive loop configured to enclose an area, the first conductive loop configured to resonate and generate an induced current when excited by a magnetic field generated by a transmitter. The apparatus further comprises a first set of one or more capacitive elements coupled to the first conductive loop, the coupled first conductive loop and first one or more capacitive elements configured to form a first resonant circuit. The apparatus also comprises a first set of one or more lighting devices integrated with the first conductive loop, the first set of one or more lighting devices each configured to generate a light based on the induced current that flows through the first set of one or more lighting devices.

25 Claims, 9 Drawing Sheets

METHODS AND APPARATUS FOR WIRELESSLY POWERED LIGHTING

BACKGROUND

Field

The present disclosure relates generally to wireless power transfer, and more specifically to devices, systems, and methods related to wireless power transfer to remote systems such as lighting devices using various coupler coil topologies.

Description of the Related Art

Many lighting products may provide lighting numerous applications. In many instances, the lighting products may surround the periphery of an object or area and form a loop. For example, Christmas lights, under-counter lights, window accent lights, decorative lighting, mirror accent lighting, TV and wall hanging backlights, etc., all form loops and are currently desirable lighting components.

However, such lighting products require power to operate, which may be difficult to provide since these products are often located or positioned after construction or positioning of an associated product. For example, in the case of decorative lighting, decorations are often not installed or positioned until the corresponding location is fully constructed. Accordingly, finding a wired power source for the decorative lighting product used to illuminate the decorations may be difficult, as access to powered outlets may not be available or may be inconvenient. Additionally wired power connections require cables or other similar connectors that are physically connected to the wired power source. Cables and similar connectors may sometimes be inconvenient or cumbersome and have other drawbacks. Wireless power systems that are capable of transferring power in free space (e.g., via a wireless field) may overcome some of the deficiencies of wired charging solutions.

In wireless power applications, wireless power systems may provide the ability to charge and/or power electronic devices without physical, electrical connections, thus reducing the number of components required for operation of the electronic devices and simplifying the use of the electronic device. Such wireless power systems may comprise a wireless power transmitter and other transmitting circuitry configured to generate a magnetic field that may be used to wirelessly transfer power to wireless power receivers. Thus, it may be convenient and desirable to wirelessly power such lighting products. There is a need for methods and apparatus for integrating wireless power reception with lighting products in close proximity with wireless power transmitters, for example decorative or task loop lighting.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure comprises an apparatus for wirelessly providing light. The apparatus comprises a first conductive loop configured to enclose an area, the first conductive loop configured to resonate and generate an induced current when excited by a magnetic field generated by a transmitter. The apparatus also comprises a first set of one or more capacitive elements coupled to the first conductive loop, the coupled first conductive loop and first one or more capacitive elements configured to form a first resonant circuit. The apparatus further comprises a first set of one or more lighting devices integrated with the first conductive loop, the first set of one or more lighting devices each configured to generate a light based on the induced current that flows through the first set of one or more lighting devices.

Another aspect of the present disclosure comprises a method for providing light with a wirelessly powered lighting product. The method comprises generating an induced current via a first conductive loop and a first set of one or more capacitive elements at a resonant frequency when exposed to a magnetic field generated by a transmitter. The method also comprises generating light via a first set of one or more lighting devices integrated with the first conductive loop based on the induced current that flows through the first set of one or more lighting devices.

An additional aspect of the present disclosure comprises an apparatus for providing light. The apparatus comprises first means for generating a first induced current when excited by a magnetic field generated by a transmitter, wherein the generating means encloses an area and is configured to resonate. The method also comprises first means for emitting light, integrated with the first generating means, based on the first induced current.

Another additional aspect of the present disclosure comprises a system for providing light via a wireless lighting product. The system comprises a wireless power transmitter configured to wirelessly transmit power via a magnetic field. The system also comprises a light emitting product. The light emitting product comprises a first conductive loop configured to enclose an area, the first conductive loop configured to resonate and generate an induced current when excited by the magnetic field generated by the transmitter, a first set of one or more capacitive elements coupled to the first conductive loop, the coupled first conductive loop and first one or more capacitive elements configured to form a first resonant circuit, and a first set of one or more lighting devices integrated with the first conductive loop, the first set of one or more lighting devices each configured to generate a light based on the induced current that flows through the first set of one or more lighting devices.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

Figure 1:
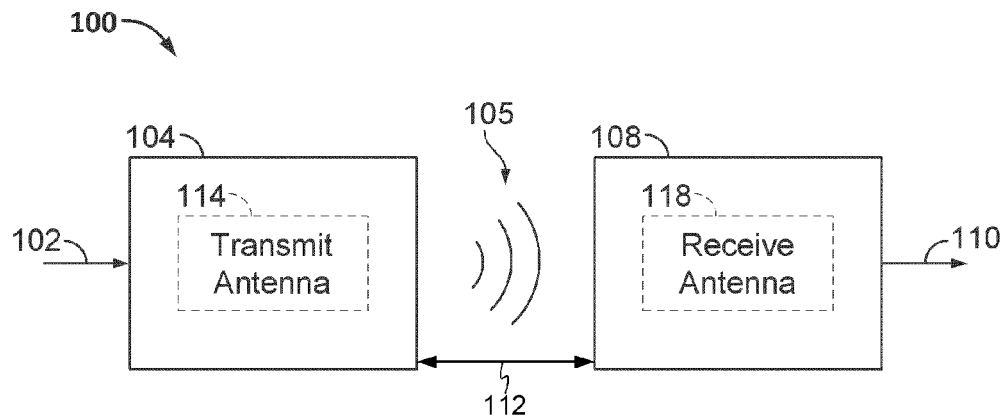
FIG. 1 is a functional block diagram of a wireless power transfer system, in accordance with one exemplary implementation.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary implementations and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specified details for the purpose of providing a thorough understanding of the exemplary implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of a wireless power transfer system 100, in accordance with one exemplary implementation. Input power 102 may be provided to a transmitter 104 from a power source (not shown) to generate a wireless (e.g., magnetic or electromagnetic) field 105 for performing wireless power transfer. A receiver 108 may couple to the wireless field 105 and generate output power 110 for storage or consumption by a device (not shown) coupled to the output power 110. Both the transmitter 104 and the receiver 108 are separated by a distance 112.

In one exemplary implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over a larger distance in contrast to purely inductive solutions that may require large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near field" of the transmitter 104 as will be further described below. The wireless field 105 may also operate over a longer distance than is considered "near field." The transmitter 104 may include a transmit antenna 114 (e.g., a coil) for transmitting energy to the receiver 108. The receiver 108 may include a receive antenna or coil 118 for receiving or capturing energy transmitted from the transmitter 104. The near-field may correspond to a region in which there are strong reactance fields resulting from the currents and charges in the transmit antenna 114 that minimally radiate power away from the transmit antenna 114. The near-field may correspond to a region that is within about one wavelength (or a fraction thereof) of the transmit antenna 114.

Figure 2:
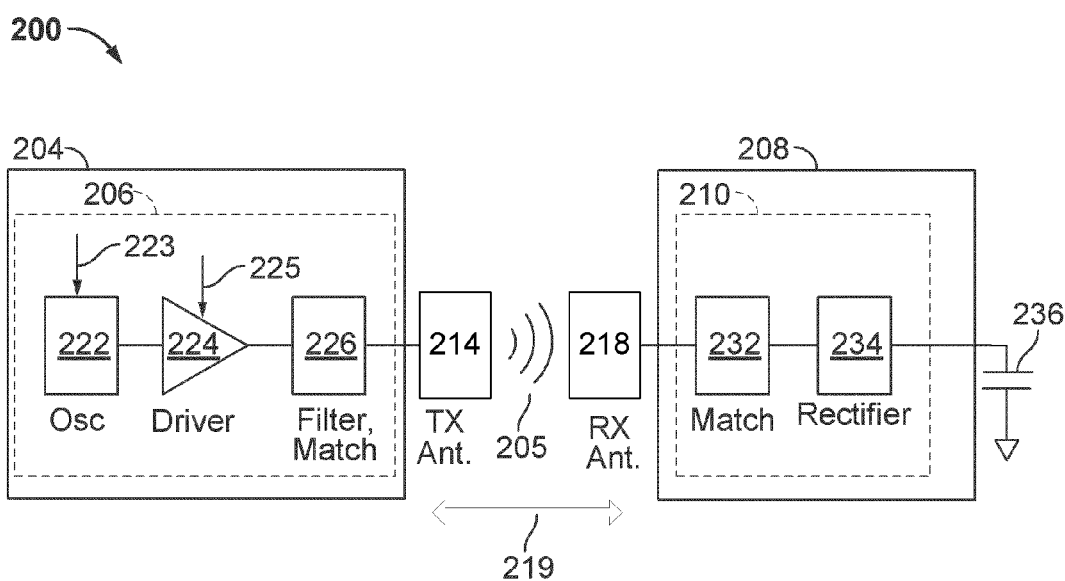
FIG. 2 is a functional block diagram of a wireless power transfer system, in accordance with another exemplary implementation.

FIG. 2 is a functional block diagram of a wireless power transfer system 200, in accordance with another exemplary implementation. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit antenna 214 at, for example, a resonant frequency of the transmit antenna 214 based on an input voltage signal (VD) 225. The driver circuit 224 may be a switching amplifier configured to receive a square wave from the oscillator 222 and output a sine wave. For example, the driver circuit 224 may be a class E amplifier.

The filter and matching circuit 226 may filter out harmonics or other unwanted frequencies and match the impedance of the transmitter 204 to the impedance of the transmit antenna 214. As a result of driving the transmit antenna 214, the transmit antenna 214 may generate a wireless field 205 to wirelessly output power at a level sufficient for charging a battery 236.

The receiver 208 may include a receive circuitry 210 that may include a matching circuit 232 and a rectifier circuit 234. The matching circuit 232 may match the impedance of the receive circuitry 210 to the receive antenna 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236.

Figure 3:
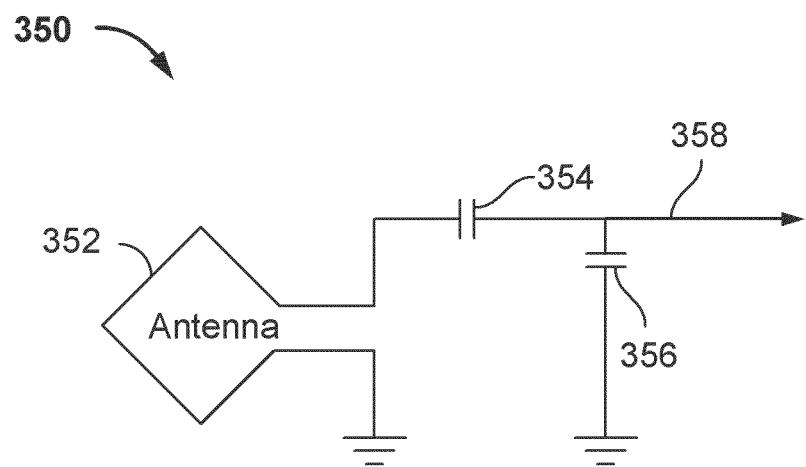
FIG. 3 is a schematic diagram of a portion of transmit circuitry or receive circuitry of FIG. 2 including a transmit or receive antenna, in accordance with exemplary implementations.

FIG. 3 is a schematic diagram of a portion of the transmit circuitry 206 or the receive circuitry 210 of FIG. 2 including a transmit or receive antenna, in accordance with exemplary implementations. As illustrated in FIG. 3, a transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, the antenna 352 is an example of a "power transfer component" of a type that is configured to wirelessly output and/or receive power.

The antenna 352 may include an air core or a physical core such as a ferrite core (not shown).

The transmit or receive circuitry 350 may form/include a resonant circuit. The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, a capacitor 354 and a capacitor 356 may be added to the transmit or receive circuitry 350 to create a resonant circuit. For a transmit circuitry, a signal 358 may be an input at a resonant frequency to cause the antenna 352 to generate a wireless field 105/205. For receive circuitry, the signal 358 may be an output to power or charge a load (not shown). For example, the load may comprise a wireless device configured to be charged by power received from the wireless field.

Other resonant circuits formed using other components are also possible. As another non limiting example, a capacitor may be placed in parallel between the two terminals of the circuitry 350.

Referring to FIGS. 1 and 2, the transmitter 104/204 may output a time varying magnetic (or electromagnetic) field with a frequency corresponding to the resonant frequency of the transmit antenna 114/214. When the receiver 108/208 is within the wireless field 105/205, the time varying magnetic (or electromagnetic) field may induce a current in the receive antenna 118/218. As described above, if the receive antenna 118/218 is configured to resonate at the frequency of the transmit antenna 114/214, energy may be efficiently transferred. The AC signal induced in the receive antenna 118/218 may be rectified as described above to produce a DC signal that may be provided to charge or to power a load.

Figure 4:
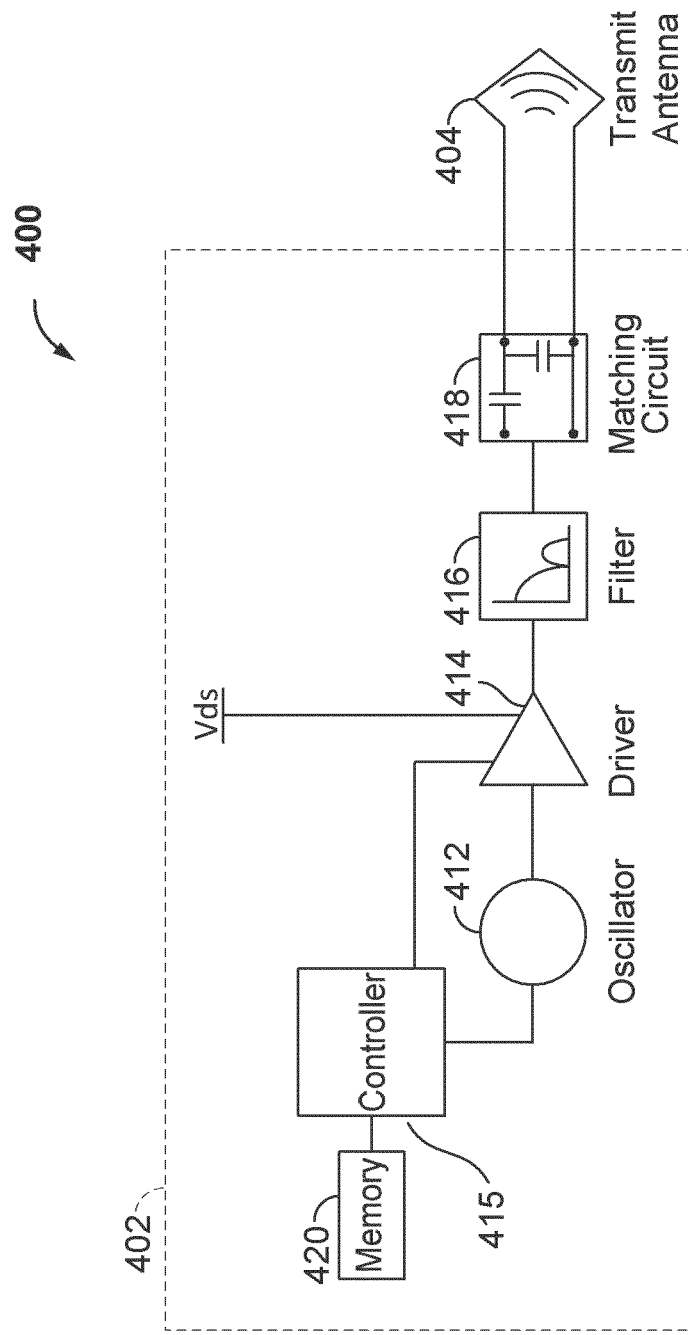
FIG. 4 is a simplified functional block diagram of a transmitter that may be used in an inductive power transfer system, in accordance with exemplary implementations of the present disclosure.

FIG. 4 is a simplified functional block diagram of a transmitter that may be used in an inductive power transfer system, in accordance with exemplary implementations of the present disclosure. As shown in FIG. 4, the transmitter 400 includes transmit circuitry 402 and a transmit antenna 404 operably coupled to the transmit circuitry 402. The transmit antenna 404 may be configured as the transmit antenna 214 as described above in reference to FIG. 2. In some implementations, the transmit antenna 404 may be a coil (e.g., an induction coil). In some implementations, the transmit antenna 404 may be associated with a larger structure, such as a table, mat, lamp, or other stationary configuration. The transmit antenna 404 may be configured to generate an electromagnetic or magnetic field. In an exemplary implementation, the transmit antenna 404 may be configured to transmit power to a receiver device within a charging region at a power level sufficient to charge or power the receiver device.

The transmit circuitry 402 may receive power through a number of power sources (not shown). The transmit circuitry 402 may include various components configured to drive the transmit antenna 404. In some exemplary implementations, the transmit circuitry 402 may be configured to adjust the transmission of wireless power based on the presence and constitution of the receiver devices as described herein. As such, the transmitter 400 may provide wireless power efficiently and safely.

The transmit circuitry 402 may further include a controller 415. In some implementations, the controller 415 may be a micro-controller. In other implementations, the controller 415 may be implemented as an application-specified integrated circuit (ASIC). The controller 415 may be operably connected, directly or indirectly, to each component of the transmit circuitry 402. The controller 415 may be further configured to receive information from each of the components of the transmit circuitry 402 and perform calculations based on the received information. The controller 415 may be configured to generate control signals for each of the components that may adjust the operation of that component. As such, the controller 415 may be configured to adjust the power transfer based on a result of the calculations performed by it.

The transmit circuitry 402 may further include a memory 420 operably connected to the controller 415. The memory 420 may comprise random-access memory (RAM), electrically erasable programmable read only memory (EEPROM), flash memory, or non-volatile RAM. The memory 420 may be configured to temporarily or permanently store data for use in read and write operations performed by the controller 415. For example, the memory 420 may be configured to store data generated as a result of the calculations of the controller 415. As such, the memory 420 allows the controller 415 to adjust the transmit circuitry 402 based on changes in the data over time.

The transmit circuitry 402 may further include an oscillator 412 operably connected to the controller 415. The oscillator 412 may be configured as the oscillator 222 as described above in reference to FIG. 2. The oscillator 412 may be configured to generate an oscillating signal (e.g., radio frequency (RF) signal) at the operating frequency of the wireless power transfer. In some exemplary implementations, the oscillator 412 may be configured to operate at the 6.78 MHz ISM frequency band. The controller 415 may be configured to selectively enable the oscillator 412 during a transmit phase (or duty cycle). The controller 415 may be further configured to adjust the frequency or a phase of the oscillator 412 which may reduce out-of-band emissions, especially when transitioning from one frequency to another. As described above, the transmit circuitry 402 may be configured to provide an amount of power to the transmit antenna 404, which may generate energy (e.g., magnetic flux) about the transmit antenna 404.

The transmit circuitry 402 may further include a driver circuit 414 operably connected to the controller 415 and the oscillator 412. The driver circuit 414 may be configured as the driver circuit 224 as described above in reference to FIG. 2. The driver circuit 414 may be configured to drive the signals received from the oscillator 412, as described above.

The transmit circuitry 402 may further include a low pass filter (LPF) 416 operably connected to the transmit antenna 404. The low pass filter 416 may be configured as the filter portion of the filter and matching circuit 226 as described above in reference to FIG. 2. In some exemplary implementations, the low pass filter 416 may be configured to receive and filter an analog signal of current and an analog signal of voltage generated by the driver circuit 414. The analog signal of current may comprise a time-varying current signal, while the analog signal of current may comprise a time-varying voltage signal. In some implementations, the low pass filter 416 may alter a phase of the analog signals. The low pass filter 416 may cause the same amount of phase change for both the current and the voltage, canceling out the changes. In some implementations, the controller 415 may be configured to compensate for the phase change caused by the low pass filter 416. The low pass filter 416 may be configured to reduce harmonic emissions to levels that may prevent self-jamming. Other exemplary implementations may include different filter topologies, such as notch filters that attenuate specified frequencies while passing others.

The transmit circuitry 402 may further include a fixed impedance matching circuit 418 operably connected to the low pass filter 416 and the transmit antenna 404. The matching circuit 418 may be configured as the matching portion of the filter and matching circuit 226 as described above in reference to FIG. 2. The matching circuit 418 may be configured to match the impedance of the transmit circuitry 402 (e.g., 50 ohms) to the transmit antenna 404. Other exemplary implementations may include an adaptive impedance match that may be varied based on measurable transmit metrics, such as the measured output power to the transmit antenna 404 or a DC current of the driver circuit 414. The transmit circuitry 402 may further comprise discrete devices, discrete circuits, and/or an integrated assembly of components.

Transmit antenna 404 may be implemented as an antenna strip with the thickness, width and metal type selected to keep resistance losses low.

Figure 5:
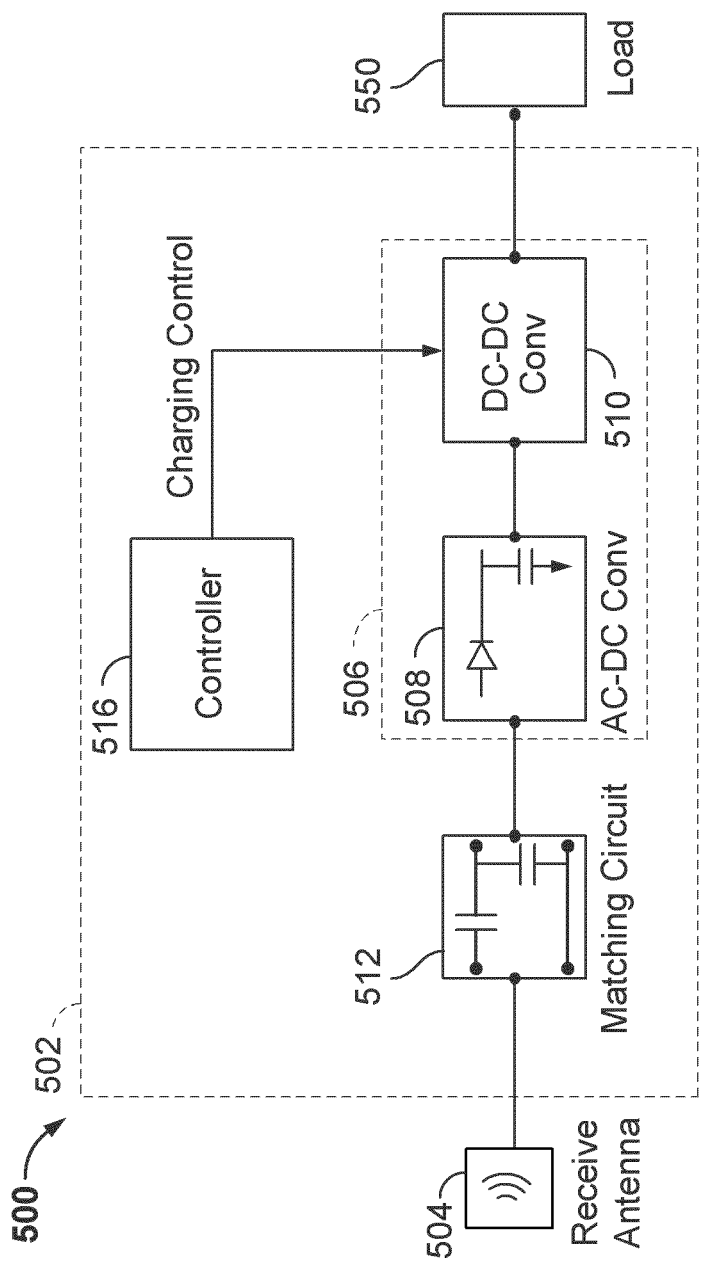
FIG. 5 is a simplified functional block diagram of a receiver that may be used in the inductive power transfer system, in accordance with exemplary implementations of the present disclosure.

FIG. 5 is a block diagram of a receiver, in accordance with an implementation of the present disclosure. As shown in FIG. 5, a receiver 500 includes a receive circuitry 502, a receive antenna 504, and a load 550. The receiver 500 further couples to the load 550 for providing received power thereto. Receiver 500 is illustrated as being external to device acting as the load 550 but may be integrated into load 550. The receive antenna 504 may be operably connected to the receive circuitry 502. The receive antenna 504 may be configured as the receive antenna 218 as described above in reference to FIG. 2. In some implementations, the receive antenna 504 may be tuned to resonate at a frequency similar to a resonant frequency of the transmit antenna 404, or within a specified range of frequencies, as described above. The receive antenna 504 may be similarly dimensioned with transmit antenna 404 or may be differently sized based upon the dimensions of the load 550. The receive antenna 504 may be configured to couple to the magnetic field generated by the transmit antenna 404, as described above, and provide an amount of received energy to the receive circuitry 502 to power or charge the load 550.

The receive circuitry 502 may be operably coupled to the receive antenna 504 and the load 550. The receive circuitry may be configured as the receive circuitry 210 as described above in reference to FIG. 2. The receive circuitry 502 may be configured to match an impedance of the receive antenna 504, which may provide efficient reception of wireless power. The receive circuitry 502 may be configured to generate power based on the energy received from the receive antenna 504. The receive circuitry 502 may be configured to provide the generated power to the load 550. In some implementations, the receiver 500 may be configured to transmit a signal to the transmitter 400 indicating an amount of power received from the transmitter 400.

The receive circuitry 502 may include a processor-signaling controller 516 configured to coordinate the processes of the receiver 500 described below.

The receive circuitry 502 provides an impedance match to the receive antenna 504. The receive circuitry 502 includes power conversion circuitry 506 for converting a received energy into charging power for use by the load 550. The power conversion circuitry 506 includes an AC-to-DC converter 508 coupled to a DC-to-DC converter 510. The AC-to-DC converter 508 rectifies the AC energy signal received at the receive antenna 504 into a non-alternating power while the DC-to-DC converter 510 converts the rectified AC energy signal into an energy potential (e.g., voltage) that is compatible with the load 550. Various AC-to-DC converters are contemplated including partial and full rectifiers, regulators, bridges, doublers, as well as linear and switching converters.

The receive circuitry 502 may further include a matching circuit 512. The matching circuit 512 may comprise one or more resonant capacitors in either a shunt or a series configuration. In some implementations these resonant capacitors may tune the receive antenna to a specific frequency or to a specific frequency range (e.g., a resonant frequency).

The load 550 may be operably connected to the receive circuitry 502. The load 550 may be configured as the battery 236 as described above in reference to FIG. 2. In some implementations the load 550 may be external to the receive circuitry 502. In other implementations the load 550 may be integrated into the receive circuitry 502.

Loop structures formed from conductive materials may be able to capture magnetic fields to provide power. This power may then be applied to various loads, such as to a loop of lighting nodes. The lighting nodes and the loop structure are tightly integrated. In some cases, the lighting nodes are distributed loads on the loop structure, thus reducing voltage ranges at any one point along the loop structure and reducing the conductive materials needed within the loop structure itself. Accordingly, a transmitter that operates at very low H-field levels may remotely drive the loop structure covering a large area and comprising a plurality of lighting nodes. The ability to operate at these low H-field levels may mitigate concerns about inadvertent or excessive H-field exposure and inadvertent reception of power by both devices capable of wireless power reception and devices not capable of wireless power reception.

Furthermore, some wireless power transfer devices utilize dedicated components to enable the wireless power transfer. For example, a wireless power receiver generally comprises an antenna that resonates when exposed to a wireless field. The antenna is then coupled to additional components of the receiver, which complicates the receiver circuit. However, in devices having a loop-like structure or form, the natural loop-like structure itself may be configured to function as the resonator. The antenna component may be eliminated while still enabling wireless power reception capabilities. Accordingly, the circuit of the receiver may be simplified as compared to the receiver with a dedicated antenna component. Thus, the power receiving capabilities are distributed about the receiver and are not performed at a single location.

Figure 6B:
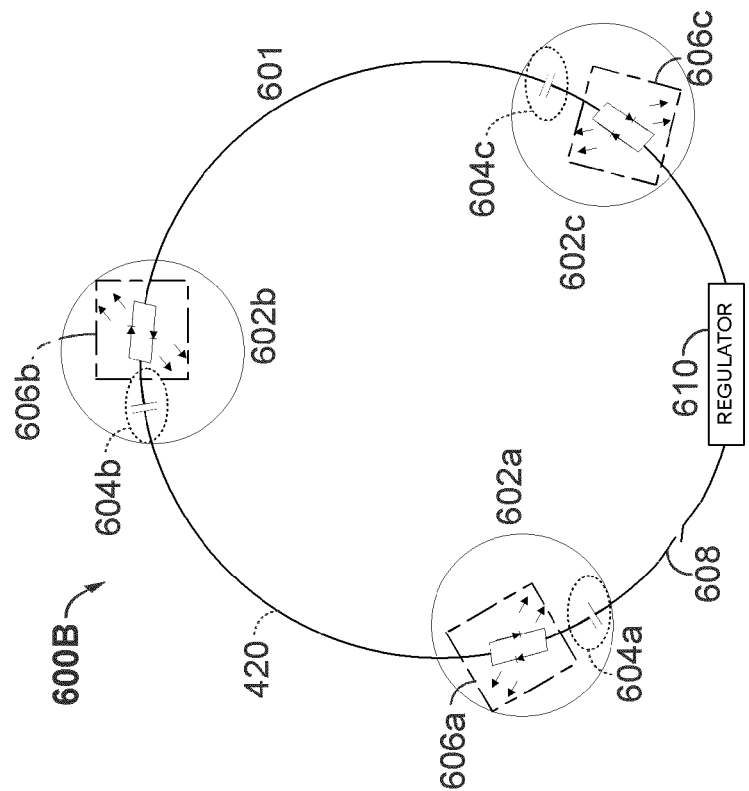
FIG. 6B is a schematic for the lighting product of FIG. 6A, further comprising a current regulator, in accordance with exemplary implementations of the present disclosure.
Figure 6A:
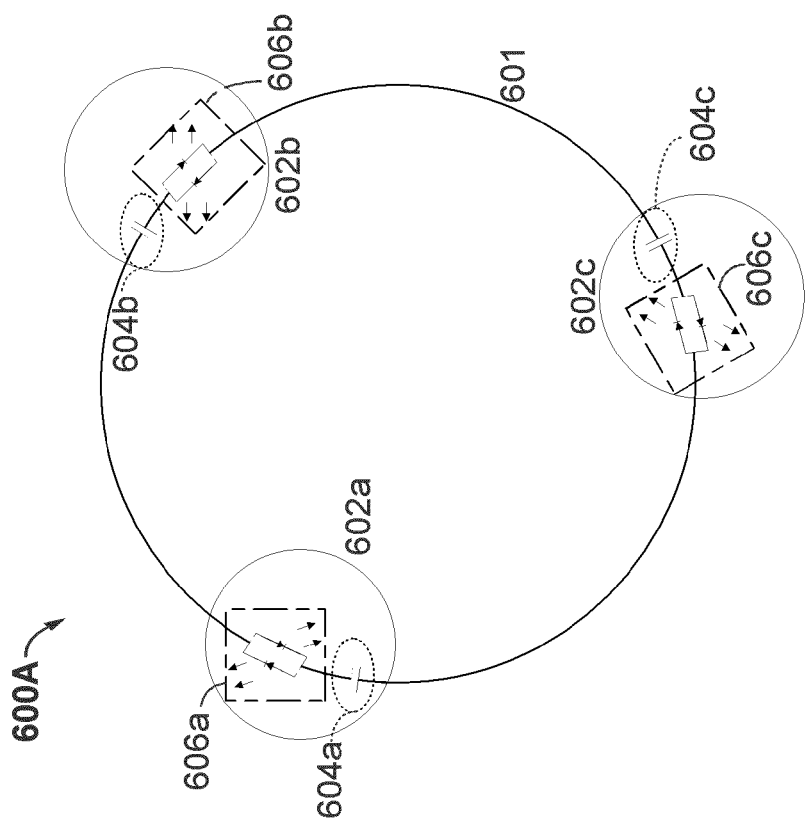
FIG. 6A is a schematic for a lighting product that integrates a loop structure of the light product with necessary components to capture magnetic fields and generate power and light from the captured magnetic field, in accordance with exemplary implementations of the present disclosure.

FIG. 6A is a schematic for a lighting product 600A that integrates a loop structure of the light product with necessary components to capture magnetic fields and generate power and light from the captured magnetic field, in accordance with exemplary implementations of the present disclosure. The lighting product 600A comprises a loop structure ("loop") 601 and three lighting nodes 602a-602c. Each of the lighting nodes 602a-602c comprises a capacitor 604a-604c and a light emitting component 606a-606c, respectively. For example, the lighting node 602a comprises the capacitor 604a and the light emitting component 606a. The lighting product with the loop 601 and the lighting nodes 602a-602c may comprise the receiver as described herein. Accordingly, the receiving capabilities and the lighting components are provided by the lighting product 600

The loop 601 may comprise any conductor that may couple the lighting nodes 602a-602c that are distributed within the loop 601. For example, the loop 601 may comprise copper wire, aluminum wire, or any other conductor commonly used in low cost lighting products. Though the loop 601 is a circular loop, the loop 601 may be formed in any shape (e.g., square, rectangle, etc.). The loop 601 may be configured to resonate when exposed to the magnetic field and induce a current through the loop 601. Accordingly, the induced current in the loop 601 may pass through each lighting node 602a-602c, causing the lighting nodes 602a-602c to illuminate. Each lighting node 602a-602c comprises the capacitor 604a-604c, respectively, and the light emitting component 606a-606c, respectively. For each lighting node 602, the capacitor 604 is in series with the light emitting component 606. The combination of the capacitor 604 and an inherent inductance of the loop 601 forms a resonant circuit configured to resonate at a resonant operating frequency. This resonant frequency of the receiver may be variable or fixed and may be set to or approximate to the resonant frequency of the transmitter (not shown) to enable efficient power transfer, as described herein. In some embodiments, the resonant frequency may be fixed at 6.78 MHz or vary within a frequency range from 100-250 KHz.

The light emitting components 606a-606c each comprise two LEDs in opposing configurations (e.g., in opposite directions). The two LEDs are in opposite directions to enable the light emitting components 606a-606c to emit light during both halves of AC power cycles. Alternatively, or additionally, one or more of the light emitting components 606a-606c may comprise other light emitting devices or sources (e.g., incandescent bulbs, halogen bulbs, fluorescent bulbs, other non-LED light sources, etc.). Although the loop 601 comprises three lighting nodes 602a-602c, the loop 601 may comprise any number of lighting nodes 602 based on the lighting requirements or desires.

FIG. 6B is a schematic for a lighting product 600B (corresponding to the lighting product 600A of FIG. 6A), further comprising a current regulator, in accordance with exemplary implementations of the present disclosure. Like components between the two lighting products 600A and 600B will comprise similar features and functionality and will not be described again here.

The lighting product 600B comprises the loop 601 and the three lighting nodes 602a-602c. Additionally, the lighting product 600B further includes a switching device ("switch") 608 and a current regulator 610 integrated within the loop 601. The switch 608 may be configured to allow control of the activation of the lighting product 600B. For example, when the switch 608 is "closed" (e.g., allowing current to flow through the switch 608), the switch 608 may allow the loop 601 to induce the current when exposed to the magnetic field. When the switch 608 is "open" (e.g., not allowing current to flow through the switch 608), the switch 608 may not allow the loop 601 to induce the current when exposed to the magnetic field. Alternatively, or additionally, the switch 608 may be configured to regulate brightness of the lighting product 600B by opening and closing at specific frequencies. The current regulator 610 may serve a similar purpose to regulate the brightness of the lighting nodes 602a-602c by regulating the current flow through the loop 601. As a distance between the transmitter and the receiver changes, the current induced in the loop 601 may change, which may cause the brightness of the lighting nodes 602 to change. Regulating the current with the current regulator 610 may serve to maintain the current flow at a constant current and thus maintain the brightness of the lighting nodes 602 at a constant current regardless of the distance between the transmitter and the receiver.

Various current regulators may be implemented in the lighting product 600B. For example, the current regulator 610 may comprise a variable capacitor. Accordingly, the current regulator 610 may be configured to vary a capacitance at a location of the current regulator 610 in the loop 601. Varying the capacitance may cause the resonant frequency of the loop 601 to change. As the capacitance is varied causing the resonant frequency of the loop 601 to change away from the resonant frequency of the transmitter, the power delivery may decline (as the difference between the resonant frequency of the loop 601 and the resonant frequency of the transmitter increases) and, thus, be regulated. In some embodiments, the current regulator 610 may replace one of the capacitors 604a-604c of the lighting nodes 602a-602c. In some embodiments, the current regulator 610 may comprise a true variable capacitor, such as a varactor or similar device. In some embodiments, the current regulator 610 may comprise a switched circuit of capacitors that may emulate a true variable capacitor.

In some embodiments, the current regulator 610 may comprise a high frequency switch. The high frequency switch may comprise any switch component or device that is configured to open and close at a frequency greater than that which a human eye is capable of distinguishing (e.g., greater than 200 Hz). As discussed herein, when the switch is open, the lighting nodes 602 may be off and the loop 601 may be off. When the switch is closed, the lighting nodes 602 may be on and the loop 601 may be on. By adjusting an "on-time" and an "off-time" of the switch, the total brightness of the lighting nodes 602 and the lighting product 600B may be regulated.

Additionally, or alternatively, the current regulator 610 may comprise a linear resistive component. In some embodiments, a metal-oxide-semiconductor field-effect transistor (MOSFET) driven in its linear region may be used as the current regulator 610. The MOSFET (or other resistive component) may increase a resistance of the loop 601. As the resistance of the loop 601 increases, a power delivered to the lighting nodes may be reduced, thus regulating the brightness of the lighting nodes 602.

The lighting product 600 having the loop 601 and the integrated lighting nodes 602a-602c may generate a maximum power and a maximum voltage according to Equations 1 and 2 below, respectively:

$$P_{max} = \frac{\omega^2 \mu^2 H^2 S_{eff} \sigma \pi N D^3}{64} \quad \text{Equation 1}$$

$$|V| = N\frac{d}{dt}\int\int B \cdot dA = \frac{\omega \mu H N \pi D^2}{4} \quad \text{Equation 2}$$

Where:
- $\omega$—Frequency
- $\mu$—Permeability (free air in most cases)
- H—Magnetic field
- $S_{eff}$—effective conductor cross section
- $\sigma$—conductivity of the conductor
- N—number of turns of wire (usually 1)
- D—Diameter of loop As seen from the Equation 1, the maximum power generated by the loop 601 is related to a diameter of the loop 601. Thus, as the diameter of the loop 601 increases (e.g., an area covered by the loop 601 increases), the power generated by the loop 601 increases by $D^3$. As seen from the Equation 2, the maximum voltage magnitude is also related the diameter of the loop 601. As the diameter of the loop 601 increases, the voltage magnitude generated by the loop 601 increases by $D^2$. Thus, the larger the loop 601, the greater the power transfer and generated voltage magnitude where the remaining factors of the Equations 1 and 2 remain relatively constant. Such an association between the size of the loop 601 and the power transfer and/or voltage magnitude identify advantages that may be relevant where high power transmission fields may pose regulatory risks and/or challenges. Thus, according to these equations, where regulatory concerns regarding high power transmission fields may exist, lower power transmissions may be used where the size of the loop 601 of the receiver is increased to accommodate any transfer power losses or decreased voltage magnitude as a result of the lower power transmission field. In some embodiments, an angle of the loop 601 in relation to the transmitter may impact an amount of power transfer. For example, in the equations above, an additional term cos Φ may be introduced in the numerator of each equation corresponding to an angle of the loop 601 (Φ) in relation to the transmitter loop (not shown in this figure), where Φ=0 when the loop 601 is parallel with the transmitter loop. Accordingly, as the angle of the loop 601 is varied such that less of the area covered by the loop 601 is parallel to the transmitter loop, the power transferred from the transmitter to the loop 601 may be reduced.

In some embodiments, the lighting product 600 may have a larger area than the corresponding transmitter. In some embodiments, the lighting product 600 may have a smaller area than the corresponding transmitter. In some embodiments, the lighting product 600 may function as a repeating antenna that couples to the magnetic field generated by the transmitter and also resonates to generate a secondary magnetic field that can then provide wireless power to other wireless power receiving devices.

Figure 7A:
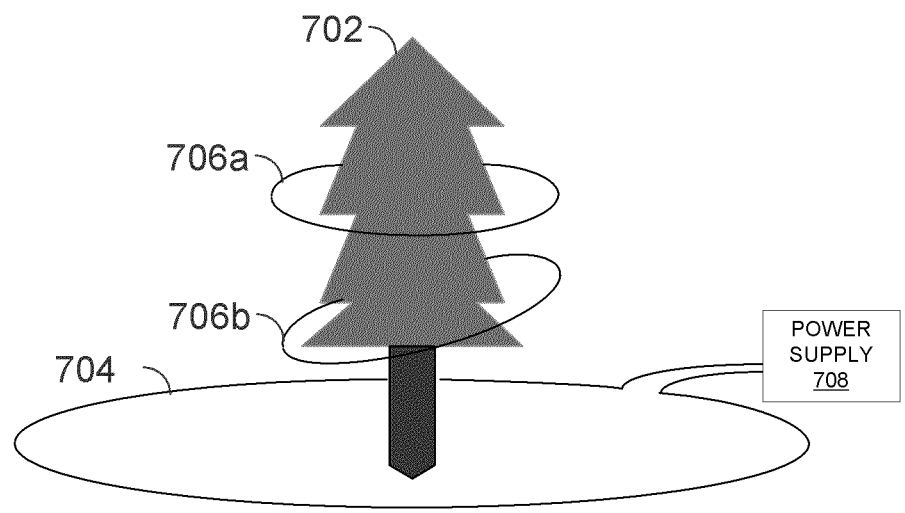
FIG. 7A shows a tree 702 having multiple lighting products placed thereon, the lighting products powered by a transmitter loop 704 that is placed in or on the ground below the tree 702, in accordance with exemplary implementations of the present disclosure.

FIG. 7A shows a tree 702 having multiple lighting products placed thereon, the lighting products powered by a transmitter loop 704 that is placed in or on the ground below the tree 702, in accordance with exemplary implementations of the present disclosure. As shown in the figure, the tree 702 comprises two lighting products 706a and 706b (corresponding to the lighting products 600A and 600B of FIGS. 6A and 6B). The tree 702 is positioned at approximately a center of the transmitter loop 704. The transmitter loop 704 is coupled to a power supply 708. The transmitter loop 704 and the power supply together may form the transmitter as described herein. In some embodiments, the transmitter loop 704 may be placed on the ground at the base of the tree 702, while in other embodiments, the transmitter loop 704 may be partially or fully buried in the ground.

The two lighting products 706a and 706b are each positioned having an area in a horizontal direction in relation to the transmitter loop 704, where the transmitter loop 704 is disposed in the horizontal direction. The transmitter loop 704 covers an area that extends beyond edges of the tree 702. Accordingly, the transmitter loop 704 generates a magnetic field that can wirelessly transfer power to receivers within the magnetic field, including the lighting products 706a and 706b. As described herein, loops of the lighting products 706a and 706b induce a current when exposed to the magnetic field generated by the transmitter loop 704, and the current causes the lighting nodes of the lighting products 706a and 706b to emit light. Thus, the lighting products 706a and 706b placed on the tree 702 may generate light without any wires connecting the lighting products 706a and 706b to a power source.

In order to induce the current when exposed to the magnetic field, the loops of the lighting products 706a and 706b may have at least a component of an area that is parallel to the area of the transmitter loop 704. In other words, the lighting products 706a and 706b should not be perpendicular to the transmitter loop 704.

Figure 7B:
FIG. 7B shows the tree of FIG. 7A having the multiple lighting products placed thereon, the lighting products powered by a transmitter that is placed in or on a wall beside the tree, in accordance with exemplary implementations of the present disclosure.

FIG. 7B shows the tree 702 of FIG. 7A having the multiple lighting products placed thereon, the lighting products powered by the transmitter loop 704 that is placed in or on a wall beside the tree 702, in accordance with exemplary implementations of the present disclosure. Three lighting products 706a, 706b, and 706c are shown placed on the tree 702 (corresponding to the lighting products 600A and 600B of FIGS. 6A and 6B). The lighting products 706a and 706b are shown perpendicular to the transmitter loop 704 while the lighting product 706c is at an angle relative to the transmitter loop 704.

As described herein, the lighting products 706a and 706b may not generate any light or may generate very little light due to being positioned perpendicular to the transmitter loop 704. When the lighting products 706a and 706b are perpendicular to the transmitter loop 704, the loops forming the lighting products 706a and 706b may receive very little power from the magnetic field. However, the lighting product 706c may be configured to function as a repeater (e.g., a repeater antenna). Accordingly, since the lighting product 706c is not perpendicular to the transmitter loop 704, the lighting product 706c may resonantly couple to the magnetic field generated by the transmitter loop 704 and receive power wirelessly. Additionally, and/or alternatively, the lighting product 706c, which may not be perpendicular to the lighting products 706a and 706b, may be configured to resonate and create a secondary magnetic field. This secondary magnetic field may then provide wireless power to the lighting products 706a and 706b, which couple with the secondary magnetic field. Accordingly, orientation and/or placement of the lighting products 706a-706c may be varied relative to the transmitter loop 704 as long as at least one of the lighting products 706a-706c is configured to function as the repeater and provide power to any lighting products 706 that are unable to receive power from the field generated by the transmitter loop 704.

In some embodiments, the present disclosure may be applied to decorative lights placed on trees (e.g., holiday lights, nets, etc.). Holiday lights often exist in loops and thus may be well suited to be integrated as described herein. Based on the description herein, large loops of holiday lights may be wirelessly powered via the magnetic field generated by the transmitter at relatively low powers, thus reducing concerns of exposure to the magnetic field. Additionally, the present disclosure may provide lighting without having power supplies in proximity to the lighting products. Trees may be located anywhere within the magnetic field generated by the transmitter loop and still be illuminated by the lighting products. Additionally, elimination of the need for wires connecting the lighting products to external power sources reduces potential trip hazards, etc.

Figure 8:
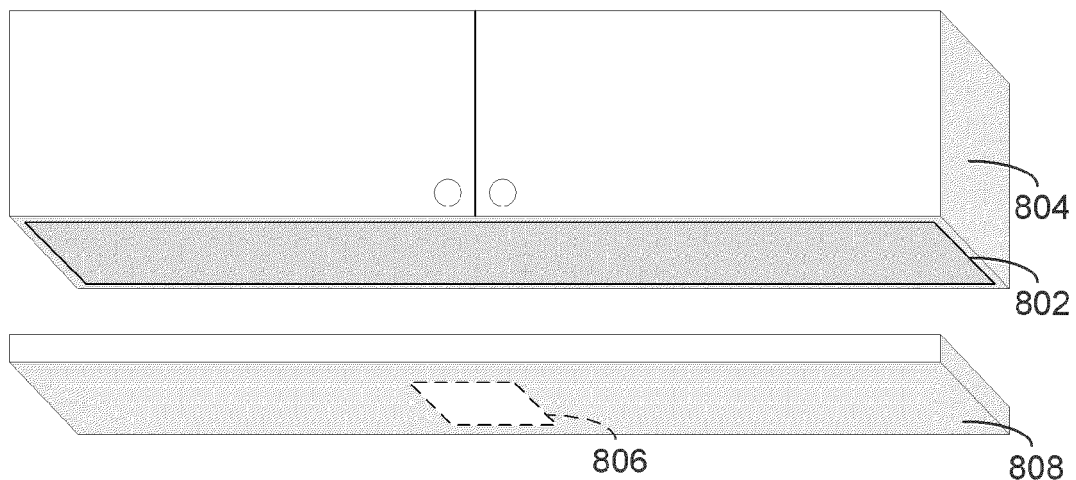
FIG. 8 shows a lighting product placed on a bottom side of a cabinet, the light product powered by a transmitter placed in or on a counter below the cabinet, in accordance with exemplary implementations of the present disclosure.

FIG. 8 shows a lighting product 802 placed on a bottom side of a cabinet 804, the lighting product powered by a transmitter loop 806 placed in or on a counter 808 below the cabinet, in accordance with exemplary implementations of the present disclosure. The lighting product 802 may correspond to the lighting products 600A and 600B of FIGS. 6A and 6B. Lighting products used to provide light below cabinets often form loops, and thus may be easily integrated into the present disclosure. Accordingly, the lighting product 802 may be installed or otherwise placed on the bottom side of the cabinet 804. The lighting product 802 may couple to a magnetic field generated by the transmitter loop 806. In some embodiments, the transmitter loop 806 may form a wireless charger for devices placed on a surface of the wireless charger. Accordingly, the wireless charger comprising the transmitter loop 806 may serve dual purposes of charging devices wirelessly as well as provide wireless power to the lighting product 802. A power supply (not shown) may drive the transmitter loop 806.

Figure 9:
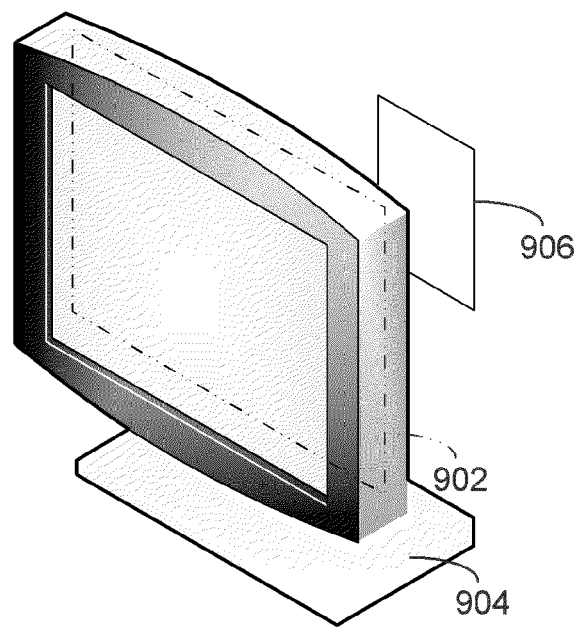
FIG. 9 shows a lighting product placed on a backside of a television, the light product powered by a transmitter placed in or on a television mount or wall behind the television, in accordance with exemplary implementations of the present disclosure.

FIG. 9 shows a lighting product 902 placed on a backside of a television 904, the light product powered by a transmitter loop 906 placed in or on a television mount or wall behind the television 904, in accordance with exemplary implementations of the present disclosure. The lighting product 902 may be similarly installed or placed on a backside of a frame or similar structure, where backlighting may be desired. The lighting product 902 may correspond to the lighting products 600A and 600B of FIGS. 6A and 6B. Such lighting products may be useful to provide backlighting for artwork installed irrespective of locations of power outlets, etc., or for television backlighting where outlets may be limited or where physical wiring may be not be aesthetically pleasing or desirable.

Figure 10:
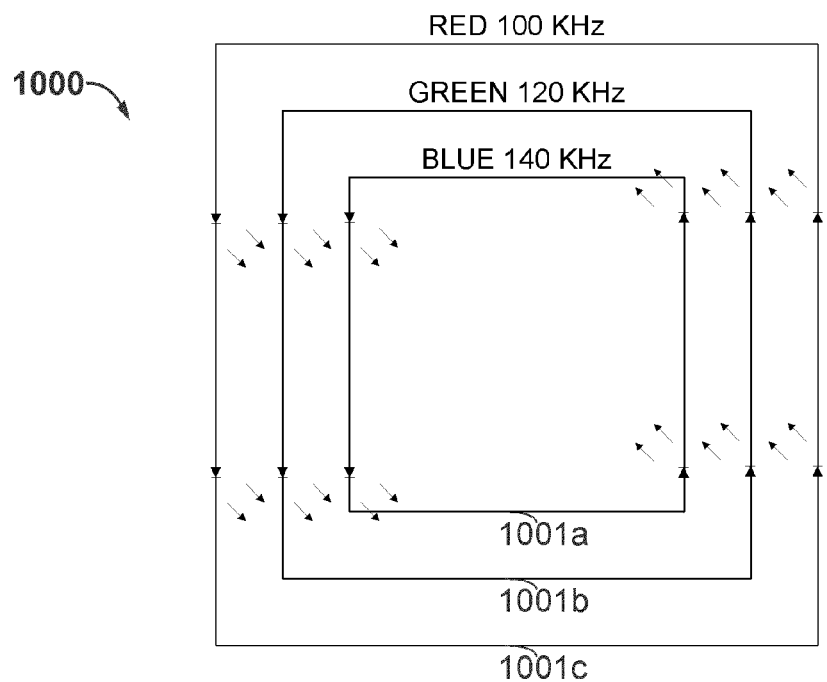
FIG. 10 shows a schematic of a lighting product that integrates three loops, each loop having lighting nodes of a single color (for example, red, green, and blue), in accordance with exemplary implementations of the present disclosure.
Figure 10:
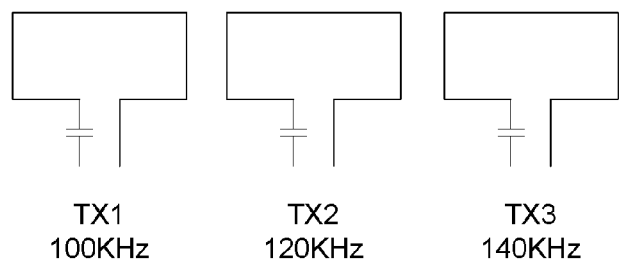

FIG. 10 shows a schematic of a lighting product 1000 that integrates three loops 1001a-1001c, each loop 1001a-1001c having lighting nodes of a single color (for example, red, green, and blue), in accordance with exemplary implementations of the present disclosure. The lighting product 1000 may correspond to the lighting product 600A and 600B of FIGS. 6A and 6B. The loop 1001a may comprise lighting nodes that emit red light, while the loop 1001b may comprise lighting nodes that emit green light and the loop 1001c may comprise lighting nodes that emit blue light. Each of the loops 1001a-1001c and its corresponding lighting nodes may be configured to be resonantly tuned to different frequencies than each of the other loops 1001a-1001c. In some embodiments, each loop 1001a-1001c may have a similar inductance values. Accordingly, each loop 1001a-1001c may be configured with different resonant frequency values by changing the values of the respective capacitors. Thus, following Equation 3 below, the resonant frequency for each loop 1001a-1001c may be calculated:

$$F = \frac{1}{2\pi\sqrt{LC}} \quad \text{Equation 3}$$

Where:
  F—Frequency
  L—Inductance of the loop
  C—Capacitance of the loop

Accordingly, each of the loops 1001a-1001c can be paired with its own transmitter that is configured to operate at the respective matching resonant frequency (e.g., 100 MHz, 120 MHz, and 140 MHz, respectively). Each of the loops 1001a-1001c may pick up power from a frequency that is close to its resonant frequency—for example, the 100 Mhz loop 1001a may still pick up some power from a 120 Mhz source. This "crossfeeding" of power from one frequency to another can be minimized by 1) ensuring that each loop 1001a-1001c has a sufficiently high Q factor that allows each loop 1001a-1001c to better attenuate frequencies away from its resonant frequency and 2) the resonant frequencies of the loops 1001a-1001c are far enough apart. Each of the loops 1001a-1001c may then be controlled and illuminated separately by its respective transmitter. Accordingly, the brightness/activation of each color of lights may be individually controlled to generate any desired color in the color spectrum using the three loops 1001a-1001c at different levels. In some embodiments, one or more these loops 1001a-1001c may comprise a current regulator to further allow control of the brightness of each loop. In some embodiments, each of the three loops 1001a-1001c may be powered by a single transmitter at a single resonant frequency, but each loop 1001a-1001c may comprise individually controllable current regulators, thus allowing the three loops 1001a-1001c to generate any desired color but with only a single transmitter.

Figure 11:
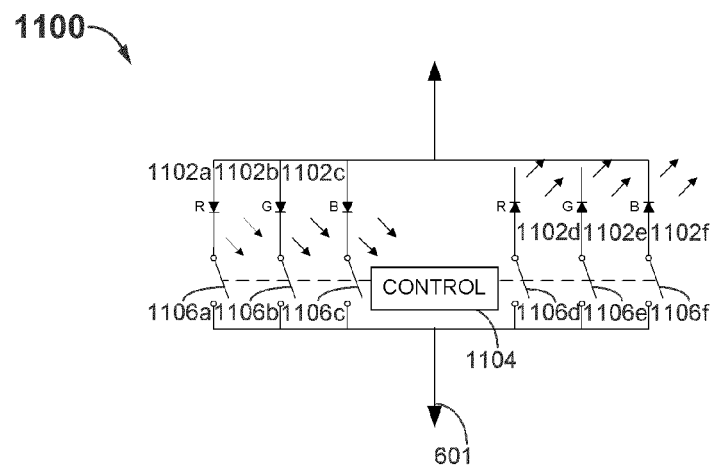
FIG. 11 shows a schematic of a lighting node that comprises a circuit of light emitting components, the lighting node configured to illuminate light of any color, in accordance with exemplary implementations of the present disclosure.

FIG. 11 shows a schematic of a light emitting component 1100 that comprises a circuit of light emitting diodes, the light emitting component 1100 configured to emit light of any color, in accordance with exemplary implementations of the present disclosure. The light emitting component 1100 may replace the light emitting component 606 of FIGS. 6A and 6B. The light emitting component 1100 may comprise an alternative way to the lighting product of FIG. 10 for generating light of any color. In FIG. 11, instead of having multiple loops each with their own light emitting components, a single loop of a single lighting product may comprise multiple lighting nodes that each comprise the light emitting component 1100.

The light emitting component 1100 comprises six diodes 1102a-1102f (one for each of red, blue, and green in each direction, so a pair of red diodes, a pair of blue diodes, and a pair of green diodes). The light emitting component 1100 also includes a controller 1104 that is coupled to each of switches 1106a-1106f. The switches 1106a-1106f each allow current to flow through the diodes 1102a-1102f, respectively. The controller 1104 chooses which switches 1106a-1106f to open or close based on the desired color. The controller 1104 may be configured (and the switches 1106a-1106f may be configured accordingly) to open and close the switches 1106a-1106f in a pulse-width modulation (PWM), or similar, pattern. Such a pattern may allow each pair of diodes 1102a-1102f (via the switches 1106a-1106f) to be controlled to create any desired color. In some embodiments, the controller 1104 may be configured to execute a locally selected pattern (e.g., slow transition between random colors) or may be controlled by an external control source (e.g., the transmitter) on a specific PWM pattern to implement to establish a specific color. In some embodiments, the external source may request a specific color and the controller 1104 may determine the necessary PWM to emit the specific color. In some embodiments, the light emitting component 1100 may be part of the lighting product that is configured to receive both power and data wirelessly via the magnetic field. In some embodiment, data and/or information may be integrated with the transmitted wireless power (e.g., via amplitude modulation and/or frequency modulation).

Figure 12:
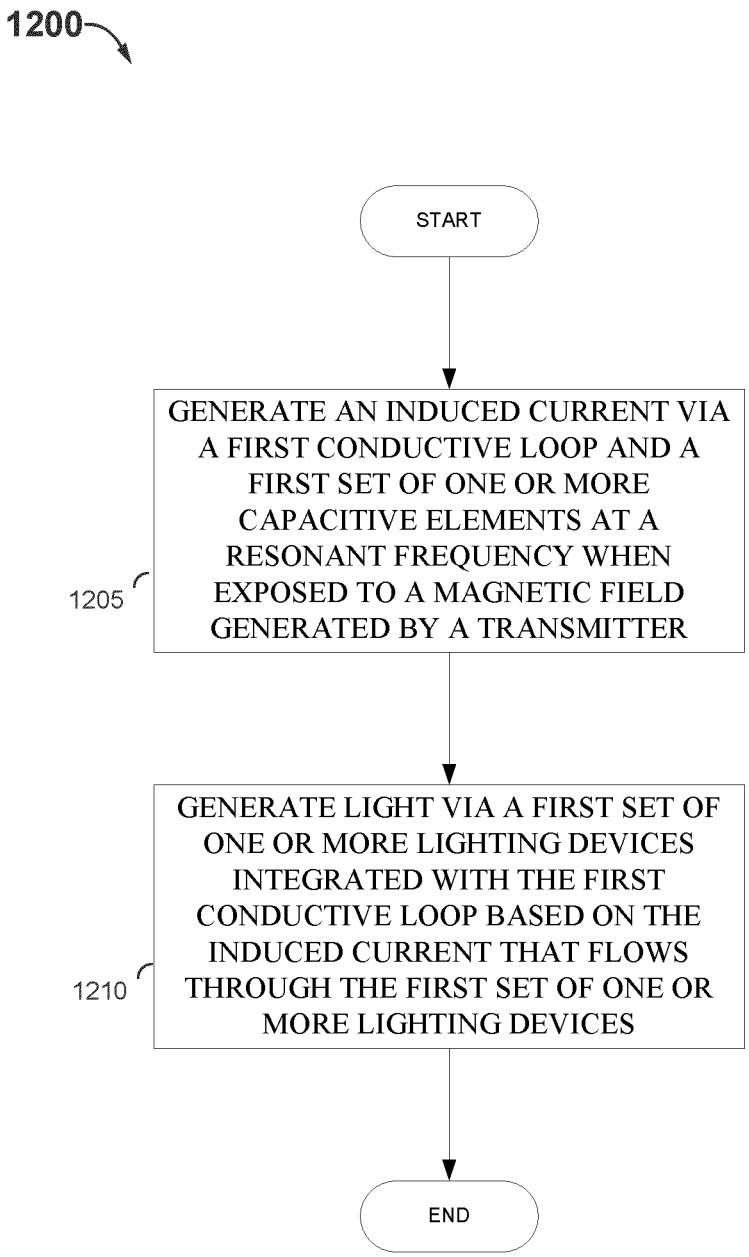
FIG. 12 is a process flow diagram of an exemplary method 1200 for providing light with a wirelessly powered lighting product, in accordance with certain aspects of the present disclosure.

FIG. 12 is a process flow diagram of an exemplary method 1200 for providing light with a wirelessly powered lighting product, in accordance with certain aspects of the present disclosure. For example, the method could be performed by the lighting product 600A or 600B illustrated in FIG. 6. Method 1200 may also be performed by the receiver 500 (FIG. 5) in some aspects. A person having ordinary skill in the art will appreciate that the method 1200 may be implemented by other suitable devices and systems. Although the method 1200 is described herein with reference to a particular order, in various aspects, blocks herein may be performed in a different order, or omitted, and additional blocks may be added. Operation block 1205 includes generating an induced current via a first conductive loop and a first set of one or more capacitive elements at a resonant frequency when exposed to a magnetic field generated by a transmitter. Operation block 1210 includes generating an induced current via a first conductive loop and a first set of one or more capacitive elements at a resonant frequency when exposed to a magnetic field generated by a transmitter.

An apparatus for providing light may perform one or more of the functions of method 1200, in accordance with certain aspects described herein. The apparatus may comprise a means for generating an induced current. In certain aspects, the means for generating an induced current can be implemented by the receive antenna 504 (FIG. 5) or the loop 601. In certain aspects, the means for generating an induced current can be configured to perform the functions of block 1205 (FIG. 12). The apparatus may comprise means for generating light. In certain aspects, the means for generating light can be implemented by the light emitting components 606a or any other light emitting or generating device. In certain aspects, the means for generating light can be configured to perform the functions of block 1210 (FIG. 12).

In some embodiments, an apparatus for receiving wireless power and emitting light may comprise, in some aspects, the lighting product 600A or 600B of FIGS. 6A and 6B and the lighting product 600A and 600B may perform associated functions and methods.

In some embodiments, the lighting product 600A comprises a first means for generating a first induced current when excited by a magnetic field generated by a transmitter, wherein the generating means encloses an area and is configured to resonate. The first means may correspond to the loop 601 of FIG. 6A and the lighting product 600A. In some embodiments, the first means may comprise the capacitors 604 of FIG. 6A.

In some embodiments, the lighting product 600A comprises a first means for emitting light, the first emitting light means integrated with the first generating means. For example, in some embodiments, the first means for emitting light may comprise the light emitting components 606 of FIGS. 6A and 6B. In some embodiments, the first light emitting means may comprise LEDs or other light emitting devices.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, means for generating a first induced current may comprise an antenna or other object configured to resonant when exposed to a wireless field generated by a transmitter. In some embodiments, the means for generating a first induced current may be coupled to a receive antenna configured to receive power and/or data from the wireless field to which the means for generating a first induced current is coupled. In some embodiments, this same means for generating a first induced current may be configured as a means for generating a wireless field when coupled to a power source. In some embodiments, the means for generating a wireless field may be coupled to a transmit circuit. In some embodiments, the means for emitting light may comprise a light emitting structure or device, such as a light bulb, an LED bulb, or any similar structure or component. In some embodiments, the means for emitting light may be distributed along or about the means for generating a first induced current. In some embodiments, the means for emitting light may be equally spaced along the means for generating a first induced current.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and method steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose hardware processor, a Digital Signal Processor (DSP), an Application Specified Integrated Circuit (ASIC), a Field Programmable Gate Array (FPGA) or other programmable logic device, discrete gate or transistor logic, discrete hardware components, or any combination thereof designed to perform the functions described herein. A general purpose hardware processor may be a microprocessor, but in the alternative, the hardware processor may be any conventional processor, controller, microcontroller, or state machine. A hardware processor may also be implemented as a combination of computing devices, e.g., a combination of a DSP and a microprocessor, a plurality of microprocessors, one or more microprocessors in conjunction with a DSP core, or any other such configuration.

The steps of a method and functions described in connection with the implementations disclosed herein may be embodied directly in hardware, in a software module executed by a hardware processor, or in a combination of the two. If implemented in software, the functions may be stored on or transmitted as one or more instructions or code on a tangible, non-transitory computer readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the hardware processor such that the hardware processor can read information from, and write information to, the storage medium. In the alternative, the storage medium may be integral to the hardware processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The hardware processor and the storage medium may reside in an ASIC.

For purposes of summarizing the disclosure, certain aspects, advantages and novel features s have been described herein. It is to be understood that not necessarily all such advantages may be achieved in accordance with any particular implementation. Thus, the present disclosure may be embodied or carried out in a manner that achieves or optimizes one advantage or group of advantages as taught herein without necessarily achieving other advantages as may be taught or suggested herein.

Various modifications of the above-described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus comprising:
    a first conductive loop configured to enclose an area, the first conductive loop configured to resonate and generate an induced current when excited by a magnetic field generated by a transmitter;
    a first plurality of capacitive elements coupled to the first conductive loop, each of the first plurality of capacitive elements distributed along the first conductive loop such that the coupled first conductive loop and first plurality of capacitive elements form a first resonant circuit; and
    a first plurality of lighting devices integrated with the first conductive loop, the first plurality of lighting devices each configured to generate a light based on the induced current that flows through the first plurality of lighting devices,
    wherein each one of the first plurality of capacitive elements is coupled in series with one of the first plurality of lighting devices to form a lighting node comprising at least one capacitive element and at least one lighting device.

2. The apparatus of claim 1, further comprising a regulator configured to regulate a brightness of the light generated by the first set of one or more lighting devices by regulating the current that flows through the first conductive loop.

3. The apparatus of claim 2, wherein the regulator comprises one of a capacitive regulator, a switchmode regulator, or a linear regulator.

4. The apparatus of claim 1, further comprising a rectifier coupled to the first conductive loop, the rectifier configured to rectify the induced current into a direct current (DC) voltage to provide power to the first plurality of lighting devices.

5. The apparatus of claim 4, further comprising a power storage device configured to store a charge based on the DC voltage.

6. The apparatus of claim 1, wherein the first conductive loop is further configured to generate a second magnetic field for wirelessly transferring power to a second conductive loop positioned such that at least a portion of an area enclosed by the second conductive loop is perpendicular to the transmitter.

7. The apparatus of claim 1, wherein the first plurality of lighting devices emits light of a first primary color and wherein the apparatus further comprises:
    a second conductive loop having a second plurality of capacitive elements integrated with the second conductive loop and a second plurality of lighting device integrated with the second conductive loop, wherein the second plurality of lighting devices emits light of a second primary color; and
    a third conductive loop having a third plurality of capacitive elements integrated with the third conductive loop and a third plurality of lighting device integrated with the third conductive loop, wherein the third plurality of lighting devices emits light of a third primary color.

8. A method for providing light with a wirelessly powered lighting product, the method comprising:
    generating an induced current via a first conductive loop and a first plurality of capacitive elements at a resonant frequency when exposed to a magnetic field generated by a transmitter, each of the first plurality of capacitive elements distributed along the first conductive loop such that the coupled first conductive loop and the first plurality of capacitive elements form a resonant circuit; and
    generating light via a first plurality of lighting devices integrated with the first conductive loop based on the induced current that flows through the first plurality of lighting devices,
    wherein each one of the plurality of capacitive elements is coupled in series with one of the plurality of lighting devices to form a lighting node comprising at least one capacitive element and at least one lighting device.

9. The method of claim 8, further comprising regulating, via a current regulator, a brightness of the light emitted by the first plurality of lighting devices by regulating the induced current that flows through the first conductive loop.

10. The method of claim 9, wherein the current regulator comprises one of a capacitive regulator, a switchmode regulator, or a linear regulator.

11. The method of claim 8, further comprising rectifying the induced current, via a rectifier coupled to the first conductive loop, into a direct current (DC) voltage to provide power to the first plurality of lighting devices.

12. The method of claim 11, further comprising storing a charge based on the DC voltage.

13. The method of claim 8, wherein the first conductive loop is further configured to generate a second magnetic field for wirelessly transferring power to a second conductive loop positioned such that at least a portion of an area enclosed by the first second conductive loop is perpendicular to the transmitter.

14. The method of claim 8, wherein generating the light via the first plurality of lighting devices comprises generating light of a first primary color and wherein the method further comprises:
generating light of a second primary color via a second plurality of lighting devices integrated with a second conductive loop based on induced current that flows through the second plurality of lighting devices; and
generating light of a third primary color via a third plurality of lighting devices integrated with a third conductive loop based on induced current that flows through the third plurality of lighting devices.

15. An apparatus for providing light, the apparatus comprising:
first means for generating a first induced current when excited by a magnetic field generated by a transmitter, wherein the generating means encloses an area and is configured to resonate;
a first plurality of means for forming a first resonant circuit when coupled to the first generating means, each of the first plurality of forming means distributed along the first generating means; and
a first plurality of means for emitting light, integrated with the first generating means, based on the first induced current that flows through the first plurality of light emitting means,
wherein each one of the first plurality of forming means is coupled in series with one of the first plurality of light emitting means to form a lighting node comprising at least one forming means and at least one light emitting means.

16. The apparatus of claim 15, further comprising means for regulating a brightness of the light emitted by the first plurality of light emitting means by regulating the first induced current that flows through the first conductive loop.

17. The apparatus of claim 16, wherein the means for regulating a brightness comprises one of a capacitive current regulator, a switchmode current regulator, or a linear current regulator.

18. The apparatus of claim 16, further comprising means for rectifying the first induced current into a direct current (DC) voltage to provide power to the first plurality of light emitting means.

19. The apparatus of claim 18, further comprising means for storing a charge based on the DC voltage.

20. The apparatus of claim 15, wherein the first generating means is further configured to generate a second magnetic field for wirelessly transferring power to a means for generating a second induced current positioned such that at least a portion of an area enclosed by the second generating means is perpendicular to the transmitter.

21. The apparatus of claim 15, wherein the each of the first plurality of light emitting means generates light of a first primary color and wherein the apparatus further comprises:
a second plurality of means for emitting light of a second primary color integrated with a second means for generating a second induced current; and
a third plurality of means for emitting light of a third primary color integrated with a third means for generating a third induced current.

22. A system comprising:
a wireless power transmitter configured to wirelessly transmit power via a magnetic field; and
a light emitting product comprising:
a first conductive loop configured to enclose an area, the first conductive loop configured to resonate and generate an induced current when excited by the magnetic field generated by the transmitter,
a first plurality of capacitive elements coupled to the first conductive loop, each of the first plurality of capacitive elements distributed along the first conductive loop such that the coupled first conductive loop and first plurality of capacitive elements form a first resonant circuit, and
a first plurality of lighting devices integrated with the first conductive loop, the first plurality of lighting devices each configured to generate a light based on the induced current that flows through the first plurality of lighting devices,
wherein each one of the first plurality of capacitive elements is coupled in series with one of the first plurality of lighting devices to form a lighting node comprising at least one capacitive element and at least one lighting device.

23. The system of claim 22, wherein the wireless power transmitter comprises a second conductive loop, the second conductive loop configured to enclose an area smaller than the area of the first conductive loop.

24. The system of claim 23, further comprising a third conductive loop comprising a second plurality of lighting devices integrated with the third conductive loop, the third conductive loop configured to resonate and generate an induced current when at least excited by a secondary magnetic field generated by the first conductive loop.

25. The system of claim 22, wherein the light emitting product further comprises a current regulator configured to control a brightness of the light emitted by the first plurality of lighting devices by regulating the induced current that flows through the first conductive loop.

* * * * *